United States Patent [19]
Amendola

[11] 4,120,669
[45] Oct. 17, 1978

[54] WASTE GAS POLLUTION CONTROL SYSTEMS

[76] Inventors: Steven C. Amendola, 11 Thornwood Pl., Scarsdale, N.Y. 10583

[21] Appl. No.: 790,575

[22] Filed: Apr. 25, 1977

[51] Int. Cl.² ............................................. B01D 53/14
[52] U.S. Cl. .......................................... 55/73; 55/6; 423/244
[58] Field of Search ................. 55/73, 6; 423/242, 244

[56] References Cited

U.S. PATENT DOCUMENTS

| | | | |
|---|---|---|---|
| 3,058,803 | 10/1962 | Hinkle, Jr. et al. | 423/242 X |
| 3,436,192 | 4/1969 | Karlsson | 423/244 X |
| 3,574,562 | 4/1971 | Kawahata | 423/242 X |
| 3,615,196 | 10/1971 | Welty, Jr. et al. | 423/242 X |
| 3,795,732 | 3/1974 | Fleming | 423/242 |
| 3,962,864 | 6/1976 | Williams et al. | 423/242 X |
| 3,987,153 | 10/1976 | Stiles | 423/244 X |
| 4,014,982 | 3/1977 | Paull et al. | 423/242 X |

FOREIGN PATENT DOCUMENTS 453,521   2/1970   Japan .................................. 423/242

*Primary Examiner*—Robert H. Spitzer
*Attorney, Agent, or Firm*—John F. Ohlandt

[57] ABSTRACT

A desulfurization process by which sulfur dioxide is efficiently removed from waste gases so as to meet current applicable pollution criteria.

3 Claims, 2 Drawing Figures

WASTE GAS POLLUTION CONTROL SYSTEMS

BACKGROUND, OBJECTS AND SUMMARY OF THE INVENTION

The present invention pertains to a method and apparatus for the control of pollution present in waste gases, and more particularly, is directed to the removal of sulfur oxides from the waste gases.

Because of the recent emphasis on the control of pollution into the atmosphere, particularly from the burning of fuels and the like, attempts have been made to switch to the use of low sulfur fuels since it is well known that the presence of sulfur constitutes a major source of pollution. Another approach, however, to the pollution problem, and particularly to that associated with the burning of fuel in large power plants, is to provide an economical technique for absorbing the noxious waste gases and converting them so as to remove substantially their sulfur dioxide content. Some of the proposals that have been made may be appreciated by reference to the following U.S. Pat. Nos. 3,501,897; 3,436,192; 3,524,720; 3,454,356; 3,508,868; 3,345,125; 3,363,401; 2,992,895; and 3,795,732. As is particularly pointed out in the first listed patent, the primary consideration when a particular system is to be adopted for controlling pollution is the cost of that system, both with respect to initial capital investment and the operating costs involved.

The present invention is concerned with achieving a desulfurization objective within reasonable costs and yet being able efficiently to reduce the sulfur dioxide content of the effluent to new strict standards. Thus, the technique of the present invention makes possible with great economy the production of tail gases which contain sulfur dioxide at levels as low as 100 p.p.m.

It is a primary object of the present invention to provide an economical pollution control system that will reduce sulfur dioxide content in waste gases to approximately 100 p.p.m.

Another subordinate or ancillary object is to efficiently convert the remaining sulfur dioxide, which is still present as a result of already practiced conversion techniques, to sulfur trioxide thereby to obtain an increment of sulfuric acid as a byproduct of the over-all process.

The above and other objects are achieved by a primary feature of the present invention which resides in the utilization of ozone generation and scrubbing techniques as an efficient and economical conversion means and, in a specific implementation, by judiciously combining ozone generation and scrubbing with established techniques so as to significantly lower the levels of sulfur dioxide already obtained by those established techniques. Thus, additional conversion of sulfur dioxide to sulfur trioxide is readily achieved by contact of the effluent with ozone; thereafter, the increased resulting amount of sulfur trioxide is removed by means of scrubbing techniques to produce a significant increment of sulfuric acid.

The present invention proceeds upon the recognition that although a simple ozone generation technique would, if applied to waste gases having a high level sulfur dioxide content (2000 p.p.m.), tend to be extremely costly, such a technique can be effectively exploited in cases where such sulfur dioxide content is about 300 p.p.m. However, in the typical case of waste gases emanating from sulfur fuel-burning plants, these consist of such a great quantity of carbon monoxide and other unburned hydrocarbons that to apply ozone generation directly would still be inefficient and uneconomical. On the other hand, if conditions are such that a relatively low sulfur dioxide content exists (approximately 300 p.p.m.) and a low hydrocarbon content is also present, then ozone generation can be utilized directly and immediately, whereby the desired results of the invention can be achieved.

Broadly considered, the present invention improves upon currently available pollution abatement techniques by contacting the gases resulting from conventional operations, which gases still contain fairly high levels of sulfur dioxide, with ozone so as efficiently to convert substantially all of the remaining sulfur dioxide therein to sulfur trioxide; and thereafter further scrubbing the gas mixture so as to absorb the thus converted sulfur trioxide.

In the context under normal consideration, that is, in connection with waste gases emanating from a power plant or the like, the present invention improves upon conventional desulfurization processes by introducing a catalytic burning step for the waste gases containing the sulfur dioxide immediately as these gases emanate from the discharge end of a combustion furnace or the like. Following the catalytic burning step, conventional steps are performed, and then the improvement step of ozone generation is applied at that state when the gases have had their sulfur dioxide content reduced sufficiently; that is, at a stage when that content is down to about 300 p.p.m.

It will be appreciated, as the description proceeds, that the principle of the invention can be variously applied in connection with a variety of industrial processes so as to realize the particular abatement of sulfur dioxide pollutants.

Other and further objects, advantages and features of the present invention will be understood by reference to the following specification in conjunction with the annexed drawing, wherein like parts have been given like numbers.

DESCRIPTION OF PREFERRED EMBODIMENTS

Figure 1:
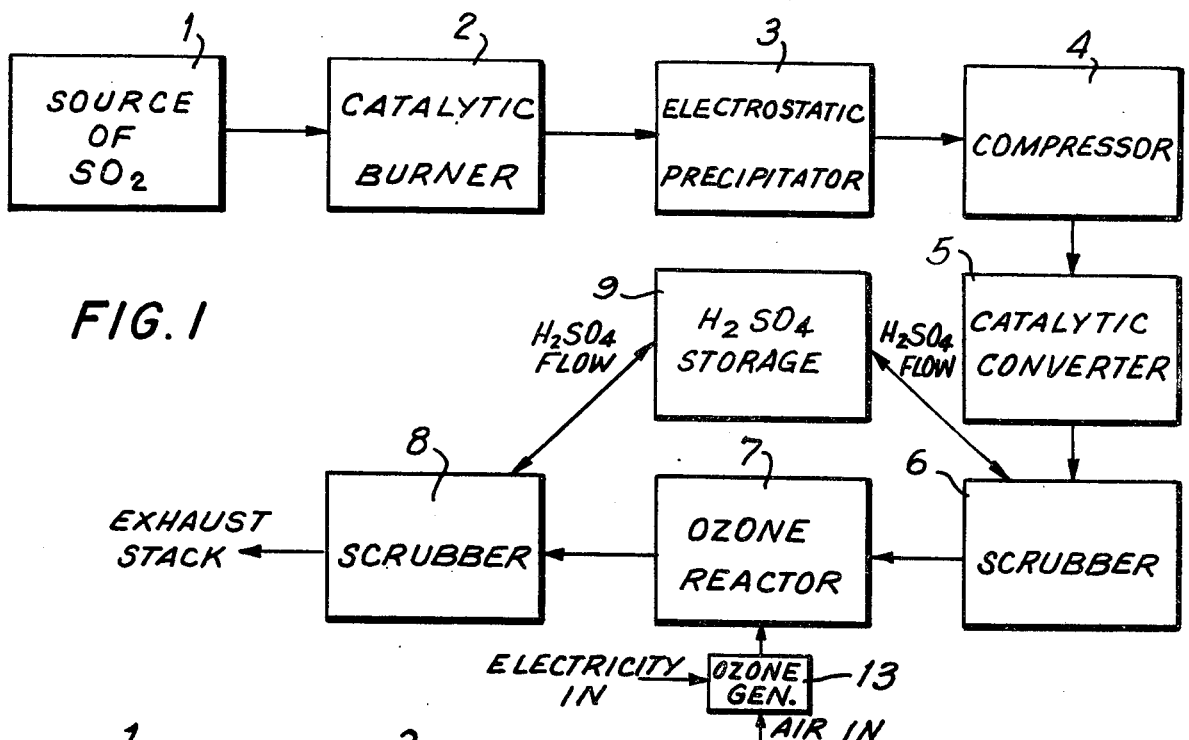
FIG. 1 is a flow chart or diagram illustrating a first embodiment in accordance with the present invention.

Referring now to the figures of the drawing, it will be noted that the present invention in its several embodiments is fundamentally directed to a solution of the sulfur dioxide pollution problem. In both embodiments ozone generation is utilized at that point or stage in the process where it can judiciously reduce the sulfur dioxide content to acceptable levels, that is, acceptable with reference to today's stringent pollution standards. In the second embodiment, that is, the embodiment of FIG. 2, electric power, in addition to sulfuric acid, is produced as a by-product or for consumption within the system to make it as self-sufficient as possible. These and other advantages will be apparent as the description proceeds.

Referring now to FIG. 1, waste or flue gases containing sulfur oxide enter the system at source 1. This source 1 can result either by reason of connection from a combustion furnace through a suitable line, or from a special furnace involving the combustion of elemental sulfur in an excess of air to produce sulfur dioxide. In the case where the flue gases come from a power plant or the like which is burning high content sulfur fuel, the waste gases are subjected to further combustion in a catalytic burner indicated at 2 in order to remove residual hydrocarbons and any carbon monoxide remaining in the waste gases. This step is performed as explained previously in order that the ozone in the later step of the process may be directed only to the purpose intended, that is, to oxidation of sulfur dioxide. As a result of this step, the carbon monoxide will be converted to carbon dioxide and the unburnt hydrocarbons will produce carbon dioxide and water; both carbon dioxide and water will not be oxidized by the ozone at the later stage to any appreciable extend. The heat derived from this combustion step, that is, the burning of the carbon monoxide and the unburnt hydrocarbons, may be used for any applicable purpose in the system.

The gases must now be cleansed of dust and fly ash; this is accomplished by any one of a variety of scrubbing techniques or as particularly illustrated in FIG. 1, by electrostatic precipitation. Such a precipitator is a well-known device and is conventionally supplied with electric utility power; however, as will be brought out hereinafter, certain modifications of the essential principle of the present invention will make electric power available as a supply to this precipitator.

A compressor 4 is used in the next step in order to compress the gases so as to speed up the conversion of sulfur dioxide to sulfur trioxide and it will also decrease the necessary size of the conversion unit to be discussed. However, this step is optional and may be eliminated inasmuch as it may turn out that in order to run the reactions at high pressures the cost may outweigh the benefits.

The gases which are conveyed to the catalytic converter 5 may be preheated by heat which is derived from the catalytic converter. Such converter may be arranged to employ the catalyst $V_2O_5$ for converting the sulfur dioxide in the incoming gases to sulfur trioxide. In this operation, the required oxygen is obtained from air suitably admitted to the converter. It is the heat of this reaction which may be used for the aforenoted preheating function. The details of such a conversion process employing $V_2O_5$ may be appreciated by reference to the aforenoted Fleming U.S. Pat. No. 3,795,732. The process described therein is sometimes called the contact process. Other processes which may be utilized are the Lurgi sulfacid process or the Penalac catalytic oxidation process, both of which processes have been specifically designed as antipollution processes. All of the aforenoted processes have the disadvantage that they cannot, in an economical way, decrease the sulfur dioxide content of the gases to levels compatible with proposed stringent antipollution measures, that is to say, to the order of 100 p.p.m.

The resulting product, that is to say, the mixture of unconverted sulfur dioxide and the sulfur trioxide, is then sent to a scrubber 6 in which the sulfur trioxide is substantially removed by contact with a spray of 96 to 98% concentration sulfuric acid from a storage tank 9. The concentration of the sulfuric acid is constantly increased by the combination with the additional sulfur trioxide being produced. In order to control the concentration, water is admitted to tank 9 at a rate sufficient to maintain the desired equalibrium of concentration.

The remaining waste gases, which still contain unacceptable amounts of sulfur oxides are then passed to an ozone reactor 7. Air is admitted to an ozone generator 13 and passes through a silent discharge of electricity to produce the required ozone. Such ozone is conveyed to reactor 7 where it meets the incoming gases from scrubber 6. If found to be desirable, the ozone generator may also be supplied with a catalyst to promote the reaction. However, this is not regarded as essential to the present invention.

It will be understood that the ozone reactor 7 causes the conversion of any of the substantial remaining sulfur oxides to sulfur trioxide and the resultant sulfur trioxide is then removed to another scrubber 8 which also obtains the necessary circulating sulfuric acid for the scrubbing operation from the storage tank 9 as indicated in FIG. 1.

As a result of the ozone generator operation and the final scrubbing operations at 6 and 8, the final gas exhausted from 8 to a suitable stack is within acceptable pollution standards.

Figure 2:
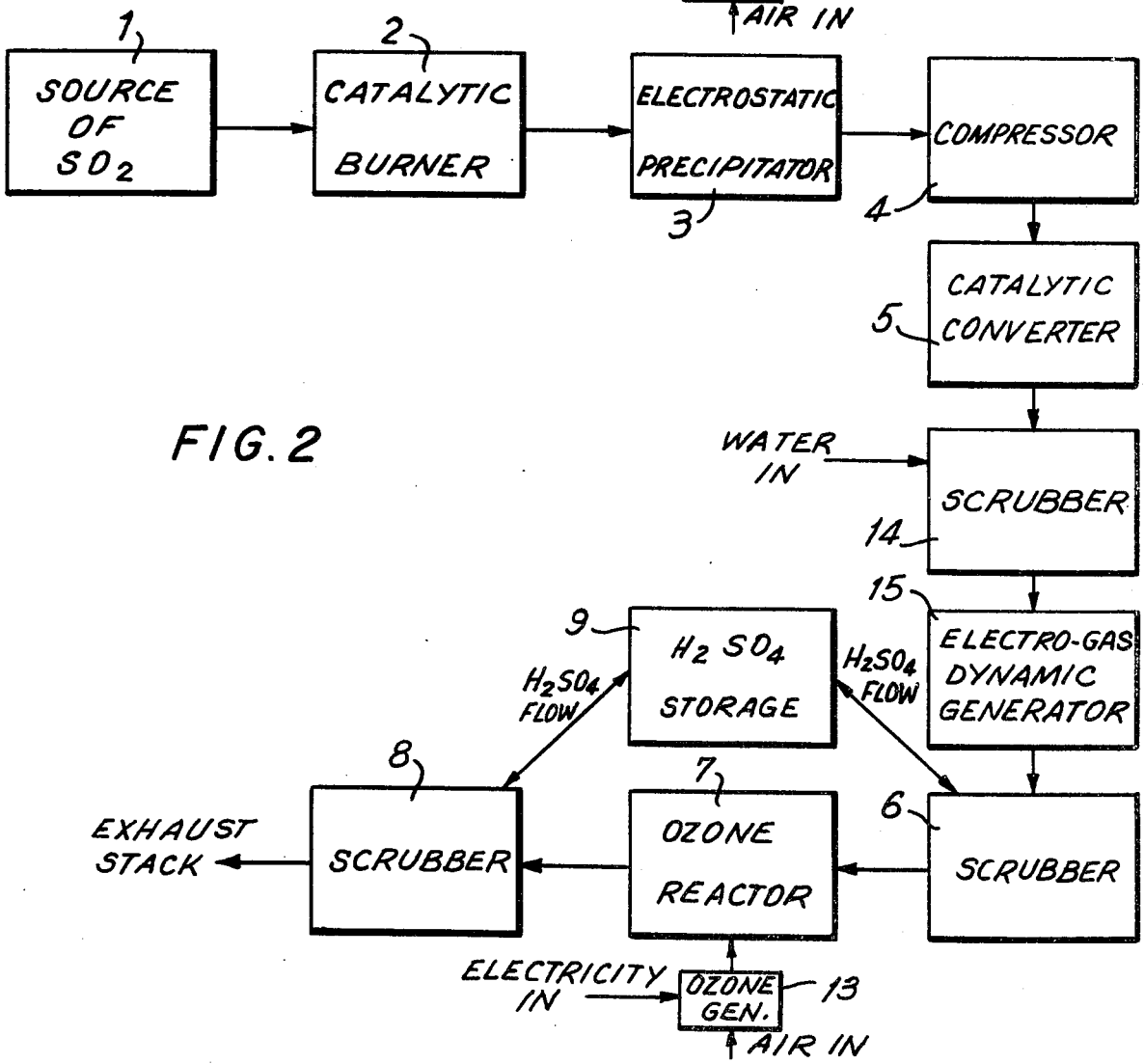
FIG. 2 is a flow chart illustrating a second embodiment of the invention.

Referring now to FIG. 2 of the drawing, another embodiment of the present invention is there depicted. In this arrangement, the basic process is the same as described for the FIG. 1 technique, that is, what is called the sulfozone process in accordance with the present invention. In the FIG. 2 embodiment, the only difference is the addition of the equipment designated 14 and 15, the former being an additional scrubber which employs water, and the latter, that is, equipment 15, consisting of an electro-gas dynamic generator. The addition of this latter equipment allows the system to recover energy from the reaction of sulfur trioxide and water, and electric power is obtained from, or as the result of, the operation within the electro-gas dynamic generator. Such resulting power may be supplied to the ozone generator 13 and to the electrostatic precipitator 3 to aid in decreasing the total cost of the operation.

An electro-gas dynamic generator operates on a rather simple principle and the details of such a generator may be apprehended for the disclosure in an article entitled "Electrohydrodynamic Power Generation" appearing in DIRECT ENERGY CONVERSION by M. Ali Kettani, Addison-Wesley Publishing Company, Reading, Mass. Basically, the principle employed is that when a charged particle is conveyed through an opposing electric field, such particle will decelerate and the resulting energy will appear as a voltage potential. The charged particle is generally an electron and such electron is deposited on droplets or a mist of some liquid.

The required mist for the electro-gas dynamic generator 15 is obtained from the scrubber 14 in which the scrubbing is accomplished by means of water rather than sulfuric acid. In other words, the sulfur trioxide is scrubbed by water in this case, the result of the reaction of the sulfur trioxide with the water being that a mist of sulfuric acid is produced. When this mist is passed through the generator 15, electric power results by reason of the passage of the mist through a slient discharge of electricity, the mist being propelled between two parallel plates that maintain an electric field. Two other plates which are ninety degrees rotated from the first two act as electrodes to pick up or absorb the energy. The energy required to produce the electricity in this device is used in pumping the charged mist through the electric field. In accordance with this second embodiment, that energy comes from the heat of reaction between sulfur trioxide and water, such heat being turned to the pressurization of the mist and producing such mist from the reaction. This mist is then pumped past the electric field by dint of its own heat and the mist becomes less energetic and therefore easier to condense as it goes on to the sulfuric acid scrubber 6.

The remainder of the system of FIG. 2 is the same as previously described in connection with FIG. 1; that is to say, following the scrubbing operation at 6, the resultant gases are then conveyed to the ozone reactor 7 and thence to the scrubber 8 before being discharged.

The incorporation of the electro-gas dynamic generator 15 into the system of FIG. 2 is believed to be particularly efficient and advantageous because such a generator requires the very mist that is easily produced in the present system as a part of the process by reason of the use of water in the scrubber 14 rather than sulfuric acid. The addition of water to the system of FIG. 2 which establishes the equilibrium concentration of the sulfuric acid in the storage tank 9 is accomplished by regulating the amount of water introduced at 14.

SPECIFIC EXAMPLE

The following example is provided to demonstrate the parameters involved in the technique of the present invention so as to produce significant pollution abatement and, more particularly, a substantial reduction in the outflow of sulfur dioxide to the atmosphere from a power plant. In a typical installation such as a 100 megawatt power plant operating at 40% efficiency and involving 10,000 btu per pound of coal with a 5% sulfur content, then for one hour of operation, approximately $8.5 \times 10^7$ lbs of $SO_2$ gas would be produced and after such $SO_2$ gas goes through a catalytic converter, assuming 90% efficiency, there would remain $8.5 \times 10^6$ lbs of $SO_2$. This translates to $6.03 \times 10^7$ moles and using the formula $SO_2 + O_3 \rightarrow SO_3 + O_2$ (1:1 ratio), then $6.03 \times 10^7$ moles of $O_3$ would be required to be generated. Air passing through the ozone generator would have to be present in the amount of $7.24 \times 10^8$ moles of air assuming an 8% conversion from air to ozone. Hence, approximately $9.54 \times 10^6$ cubic feet a minute of air would be supplied to the ozone generator 13.

It should also be noted that approximately $1.275 \times 10^8$ lbs of sulfuric acid would be produced per hour; the water required is approximately $1.063 \times 10^7$ gals per hour and the electricity required for ozone generation in $4.6 \times 10^6$ kw or approximately 5% of the total output of such power plant.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

What I claim is:

1. A method for removing sulfur oxides from waste gases, said method comprising:
    (a) converting substantial amounts of sulfur dioxide present in said waste gases to sulfur trioxide in the presence of a catalyst;
    (b) scrubbing the product resulting from step (a) with $H_2SO_4$ so as effectively to remove substantial amounts of the converted sulfur trioxide, such that the unconverted gases remaining have a reduced sulfur dioxide content of approximately 300 ppm;
    (c) reacting the unconverted gases resulting from the operations of steps (a) and (b) with ozone, thereby to convert substantially all of the sulfur dioxide remaining in the unconverted gases to sulfur trioxide;
    (d) scrubbing the gas mixture resulting from step (c) so as to remove the sulfur trioxide, whereby the sulfur dioxide content of the waste gases is reduced to approximately 100 ppm; and
    (e) further comprising the steps of additionally scrubbing the gas mixture resulting from the catalytic conversion step (a) with water, and producing electric power by passing the sulfuric acid mist resulting from the additional scrubbing operation through an electric field developed in an electro-gas dynamic generator.

2. A method as defined in claim 1, in which said waste gases contain hydrocarbons, and comprising the further step of further combusting the waste gases so as to substantially eliminate the hydrocarbons present therein.

3. A method as defined in claim 1, in which the catalyst is $V_2O_5$.

* * * * *